Patented Oct. 27, 1953

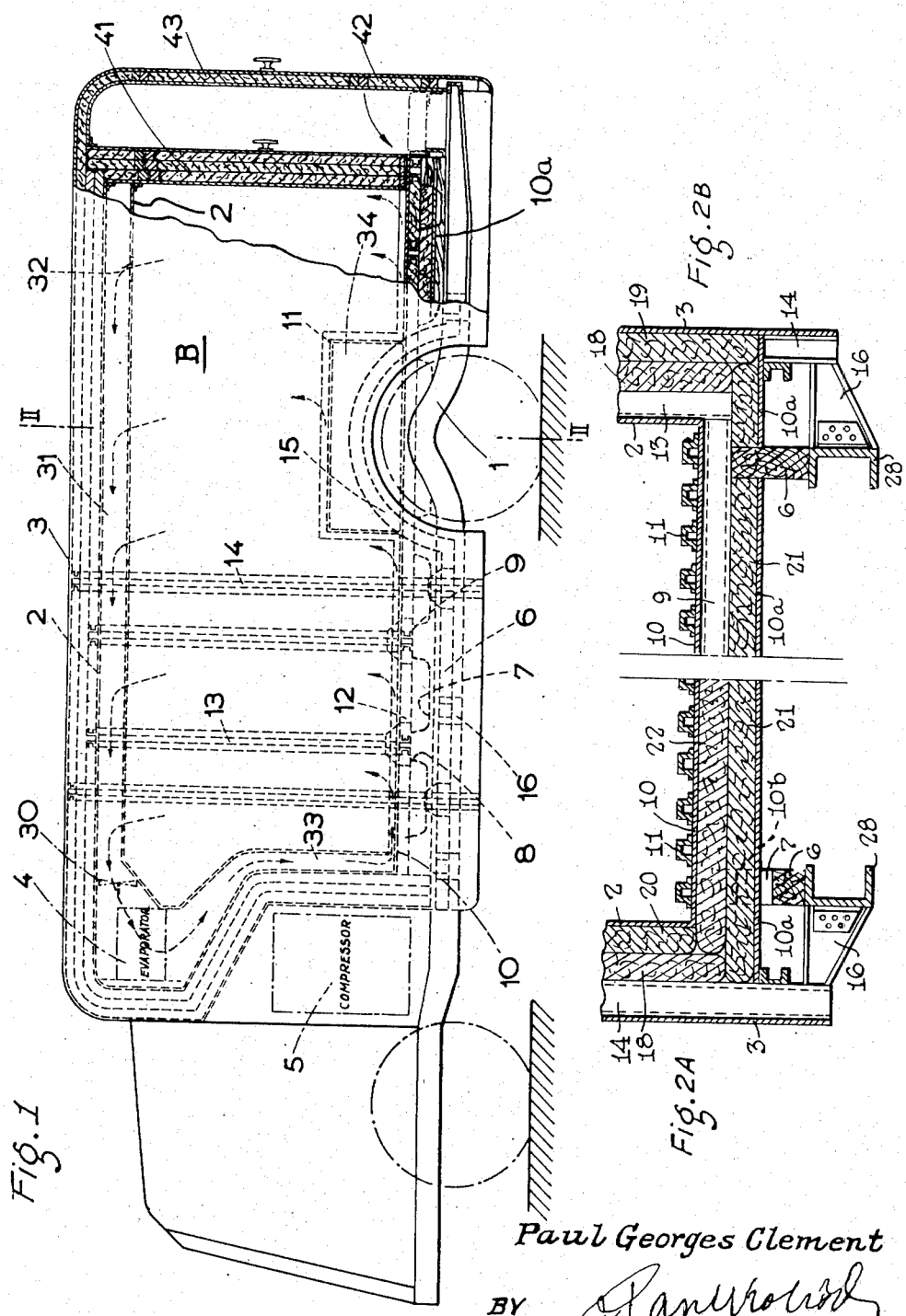

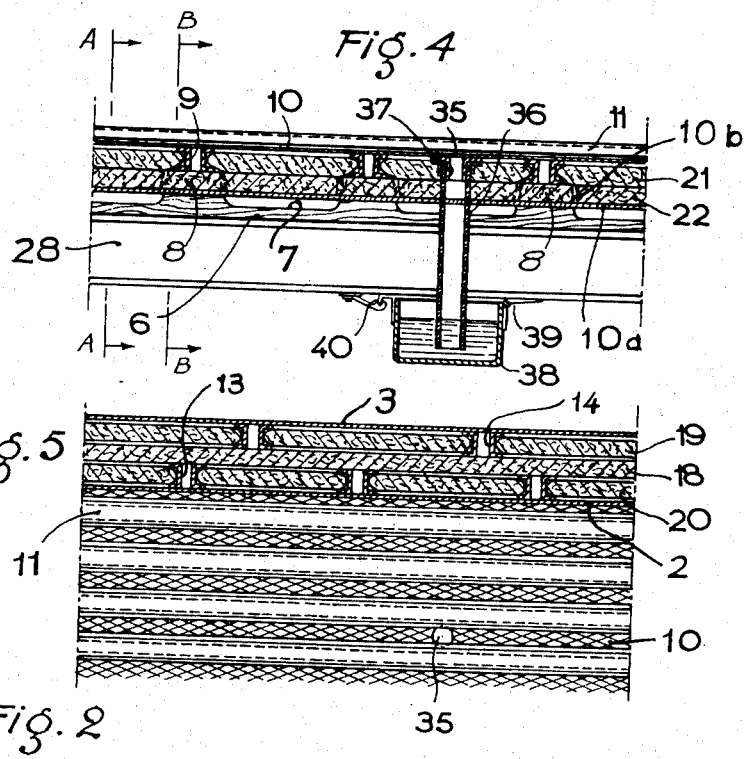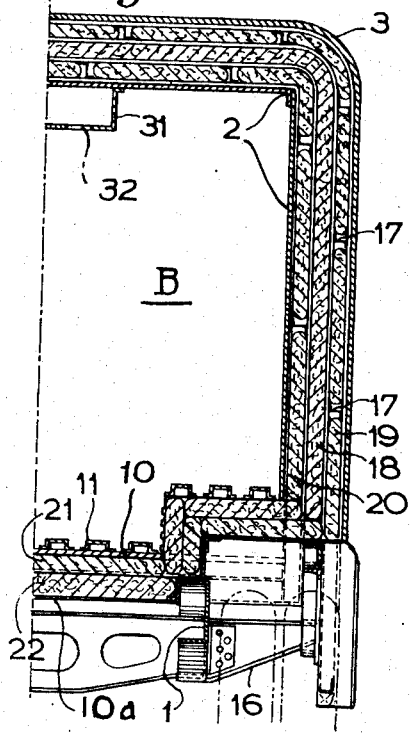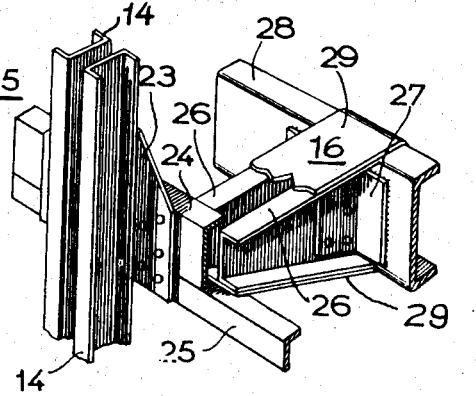

2,657,088

UNITED STATES PATENT OFFICE 2,657,088

HEAT INSULATING BODY STRUCTURE FOR ISOTHERMAL AND/OR REFRIGERATOR VEHICLES

Paul Georges Clément, Paris, France

Application March 2, 1948, Serial No. 12,674
In France March 24, 1947

4 Claims. (Cl. 296—24)

The present invention relates to heat insulating vehicle bodies as used in isothermal or refrigerating vehicles of the type including an inner and outer casing or compartment generally made of sheet metal and separated by insulating material adapted to minimize heat exchange between said inner casing and said outer casing.

There are two factors which have been found to be essential in such type of vehicle body, namely very light weight and efficient thermal insulation.

The improvements provided by the present invention meet these requirements to an extent unequalled in any prior construction known to me.

The feature of very light weight is obtained through the provision of frame elements and skin structures fabricated of light alloy sheet metal and the use of insulating lagging having a low specific gravity and high thermal insulating efficiency whereby the following requirements are met.

1. A low thermal transmission factor;
2. Internal and external protection of the insulating material against moisture; and
3. Absence of any mechanical connection between the inner and outer casings or compartments.

The last-mentioned requirement is particularly difficult to meet since the use of light-weight insulating lagging requires the use of materials which are generally in the form of flexible cushion like batts or sections which are practically devoid of any physical resistance. Accordingly, it is necessary that the inner compartment of the vehicle body be sufficiently strong to support the load and impact of the containers or goods loaded into it, and that the outer compartment be sufficiently strong and rigid to withstand external shocks and protect the insulating lagging against adverse weather conditions.

An object of the invention is to provide a vehicle body of the character described wherein a continuous layer or layers of insulating lagging will not be subject to or transmit mechanical stress.

Another object of the invention is to provide a vehicle body of the character described wherein the external body section or shell is mechanically independent of the inner body section or shell.

A further object of the invention is to provide a vehicle body of the character described wherein condensate is drained off from the inner section or shell without impairing the efficiency of the insulating material.

Another object of the invention is to provide a vehicle body of the character described wherein an access door therefor includes an intermediate or lock-chamber external thereto.

The novel features characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which Fig. 1 is a diagrammatic elevational view, partly in cross-section, of a refrigerator vehicle body constructed in accordance with the invention;

Fig. 2 is an enlarged cross-sectional view, taken on the line II—II of Fig. 1;

Figs. 2A and 2B are enlarged cross-sectional views taken on the lines A—A and B—B of Fig. 4;

Fig. 3 is a detail view in perspective showing an extension bracket constructed in accordance with the invention;

Fig. 4 is a fragmentary, longitudinal sectional view of the floor construction; and Fig. 5 is a fragmentary view, partly in plan and partly in section, of a portion of the vehicle body floor and a side wall.

Referring to the drawings in detail and particularly to Fig. 1, the refrigerator vehicle body B is mounted on the chassis 1 of an automotive vehicle which may be in the form of a truck or the like. As shown, the composite body B comprises an inner casing or shell structure 2, and an outer casing or shell structure 3. An evaporator unit 4 may be associated with the casing 2 interiorly thereof, and a compressor 5 disposed exteriorly of the casing 3 in approved manner.

In accordance with the invention, the side sills of the chassis 1 are provided with a pair of suitably secured, longitudinally extending stringer members 6 formed of wood and having spaced recesses 7 cut inwardly of their upper edge faces to define spaced upright supports 8 lengthwise thereof in transverse alignment.

A thin-gauge, light alloy metal sheet 10a, of suitable length and of a width greater than the spacing between the respective stringers 6, and provided with pierced rectangular areas at spaced points thereon, corresponding to the area of and spacing between the upright supports 8, is fitted on the upright supports 8 by forcing the metal sheet 10a downwardly thereon to displace tab portions 10b out of the plane thereof and position the same in a plane substantially below the top faces thereof to provide an external floor on the stringers 6 for supporting a plurality of layers of lagging 21 and 22 in insulating relation with an internal floor presently to be described.

A plurality of cross members 9, comprising light alloy metal channel sections of a length in excess of the spacing between the stringers 6, are disposed crosswise thereof and suitably secured in pairs on the top face of the upright supports 8 in closely adjacent parallel relation. A sheet metal section 10, of relatively heavy-gauge and having a lesser width dimension than the metal sheet 10a, is subsequently suitably secured on the cross-members 9 to provide an internal floor thereon with the layers 21 and 22 of lagging filling the space between the external and internal floor surfaces.

As shown in Figs. 2, 2A and 2B, the side margins of the external floor 10a and the layers of lagging supported thereby, extend beyond the outer sides of the stringers 6 to a greater extent than the side margins of the internal floor 10 whereby the lagging layers 21 and 22 form a juncture with other layers of insulating lagging as will presently appear.

For the purpose of adding rigidity to the internal floor 10 and to permit air circulation thereover, a plurality of channel strips 11 are suitably secured lengthwise thereof in inverted, closely spaced, parallel relation.

A horizontally extending belt plate 12 is suitably welded to the extended opposite ends of the transversely arranged cross-members 9, for the attachment thereto, as by welding, of a plurality of upstanding inverted U-shaped carline members 13 either singly or in pairs and in alignment with the cross-members 9. Thus, the members 9 form the fourth side of a plurality of closed frames or rectangles extending transversely of and about the internal floor 10 in longitudinally spaced relation to provide a rigid skeleton framework for the inner casing or shell structure 2 which is formed of light alloy metal sheeting and preferably provided with corrugations of small cross sectional dimensions to impart rigidity thereto. The inner shell 2 is suitably secured, as by spot welding or the like, internally of the skeleton framework constituted by the rectangular carline or frame members 13. Thus, the interior of the inner casing or shell 2 together with the floor 10 presents a continuous, rigid enclosure.

A similar framework carried by the chassis 1, in spaced relation to the aforesaid frame members 13, and with the outer casing or shell 3 secured to the exterior thereof, as by spot welding, also comprises a plurality of upstanding, inverted U-shaped carline members 14 which are spaced a greater distance apart longitudinally of the chassis 1 and in staggered relation to the aforesaid frame members 13 as best seen in Fig. 1.

As shown in Fig. 3 a plurality of box bracket assemblies 16 each comprising a pair of tapered channel sections 26 including angle plates 27 and cover plates 29, are welded to the side sills 28 of the chassis 1 in oppositely disposed pairs for the attachment to the free ends thereof, as by welding, of a belt structure 15, in outwardly offset relation to the side sills 28. The belt structure 15 comprises horizontally disposed parallel angle sections 24 and 25 having gusset plates 23 riveted normal thereto at spaced points therealong with the free end portions of the frame members 14 welded thereto. Thus, the outer casing or shell 3 of light alloy sheet metal is supported independently of and in spaced relation to the frame members 13 supporting the inner casing or shell 2 whereby the continuity of the insulating lagging about the inner shell 2 is made possible.

The insulating lagging occupying the space between the internal floor 10, and external floor 10a, comprises two superposed layers 21 and 22, as aforesaid, while the lagging between the side walls and roof of the respective inner and outer shells 2 and 3, is in the form of three superimposed layers, a continuous intermediate layer 18 and two outer layers 19 and 20 arranged between the frame members 13 and 14 supporting the inner and outer casings or shells 2 and 3. Inasmuch as the two outer layers 19 and 20 comprise flexible cushion-like sections or batts of foraminous insulating material, the outer side of the inner shell 2 and the inner side of the outer shell 3 are preferably suitably provided with spacer elements or strips arranged in staggered relation as indicated at 17 in Fig. 2, whereby no such element on the exterior of the shell 2, is opposite a similar element on the interior of the shell 3 so that the lagging at no point comprises less than two layers of insulating material.

As indicated in Fig. 1, a flow of cooling air is induced in the inner shell 2 by means of a suitable fan 30 whereby the cooled air from the evaporator is forced into an air duct 33. Thus, the provision of the inverted channel strips 11 on the floor 10 also permits cooling air to circulate under the strips 11 and articles disposed thereon, the ducts 32 in the roof of the inner shell 2 providing a return path to the evaporator. Moreover, it is to be observed that the inverted channel strips 11 on the floor 10 extend over the rear wheel cover or box 34 on each side of the body B in order that the flow of cooling air will not be impeded by articles which may be positioned against the said boxes 34.

As shown in Fig. 4, one or more condensate draining devices comprises a tube 36 of suitable plastic material secured to a lead bushing 37 seated in the floor 10 and depending therefrom into a syphon cup 38 hingedly mounted as at 39 and held in operative position by a suitable latch means 40 as will be understood.

As clearly shown in Fig. 1, access to the interior of the vehicle body B is provided by a double door lock-chamber comprising a door 41 in the rear end of the inner shell 2 including a suitably insulated wooden frame. A hinged panel 42, of suitable dimensions, is provided in the rear end of the outer shell 3 opposite the aforesaid door 41, whereby to form an extension of the floor of the inner shell 2 when swung inwardly as indicated by the broken lines. The lock-chamber is completed by a suitable door 43 in the rear end of the outer shell 3 which cooperates with the panel 42, when in normal position, to provide a complete door closure for the rear end of the outer shell 3 as will be understood. The construction of the hinged panel 42 is of further advantage in that it will not be damaged as in backing the vehicle against a warehouse or loading platform.

From the foregoing description it will be apparent that a vehicle body constructed in accordance with the present invention, meets the essential requirements to be fulfilled by refrigerator or isothermal vehicles by reason of its light alloy metal construction and independent mounting of the inner and outer shells in spaced relation whereby an insulating lagging of high thermal efficiency and minimum weight may be employed since it need not support or transmit mechanical stresses.

It will be understood that the invention is not to be restricted to the specific embodiment described and illustrated by way of example. Thus, while the embodiment shown relates to a refrigerator vehicle, a similar body construction may also be used in the case of an isothermal truck.

What I claim as my invention and desire to secure by Letters Patent is:

1. In an insulated automotive vehicle body including a chassis therefor, the combination of a pair of stringers secured on said chassis lengthwise thereof and providing spaced supports thereon in transverse alignment, a metallic sheet fitted on said supports in a plane substantially below the top faces thereof to provide an external floor for said body, a plurality of cross-members secured on said supports transversely of said stringers, a plurality of rectangular carline members secured to the opposite ends of said cross-members in upstanding bridging relation forming an inner framework on said chassis, a sheet metal shell secured interiorly of said framework, a metal plate secured on said cross-members forming a floor for said inner shell, a plurality of layers of insulating material between said body floor and said shell floor, an outer framework comprising a plurality of upstanding rectangular carline members disposed in spaced parallel relation mounting a sheet metal exteriorly thereof, a plurality of oppositely disposed bracket members secured to said chassis in offset relation thereto supporting said outer framework independently of and in spaced relation to said inner framework, and a plurality of layers of insulating material between said inner shell and said exterior shell in continuation of said first named layers of insulating material.

2. An insulated vehicle body according to claim 1, and in which the carline members of said outer framework extend transversely of said chassis in longitudinally staggered relation relative to the carline members of said inner framework.

3. In an insulated automotive vehicle body including a chassis therefor, the combination of a pair of stringers secured on said chassis lengthwise thereof and providing spaced supports thereon in transverse alignment, a metallic sheet fitted on said supports in a plane substantially below the top faces thereof to provide a floor for said body, a plurality of cross-members secured on said supports transversely of said stringers, a plurality of rectangular carline members secured to the opposite ends of said cross-members in upstanding bridging relation forming an inner framework on said chassis, a sheet metal shell secured interiorly of said inner framework, a metal plate secured on said cross-members forming a floor for said inner shell, a plurality of channel strips secured lengthwise of said inner shell floor in inverted, spaced, parallel relation, a plurality of layers of insulating material between said body floor and said shell floor, an outer framework comprising a plurality of upstanding rectangular carline members disposed in spaced parallel relation mounting a sheet metal shell exteriorly thereof, a plurality of oppositely disposed bracket members secured to said chassis in offset relation thereto supporting said outer framework in spaced relation to said inner framework with said exterior shell normal to and in continuation of said body floor, and a plurality of layers of insulating material between said inner shell and said exterior shell in continuation of said first named layers of insulating material.

4. An insulated vehicle body according to claim 3, and in which the rear ends of the inner and outer sheet metal shells include a lock-chamber therebetween, and a door in the rear end wall of each of said shells, the door in the rear end wall of said outer shell including a hinged panel adapted for angular movement inwardly to form an extension of the floor of the inner shell across said lock-chamber.

PAUL GEORGES CLÉMENT.

References Cited in the file of this patent

UNITED STATES PATENTS

| Number | Name | Date |
|---|---|---|
| 589,998 | Bradley | Sept. 14, 1897 |
| 1,139,457 | Ledwinka | May 11, 1915 |
| 1,542,286 | Dean | June 16, 1925 |
| 1,685,106 | Thompson et al. | Sept. 25, 1928 |
| 2,000,531 | McWilliams | May 7, 1935 |
| 2,021,909 | Brigham | Nov. 26, 1935 |
| 2,047,133 | Christianson | July 7, 1936 |
| 2,050,425 | Dean | Aug. 11, 1936 |
| 2,078,787 | Baker | Apr. 27, 1937 |
| 2,111,326 | Norris | Mar. 15, 1938 |
| 2,138,399 | Davis, Jr. | Nov. 29, 1938 |
| 2,165,559 | Lintern | July 11, 1939 |
| 2,258,402 | Baillie | Oct. 7, 1941 |
| 2,326,717 | Zeidler | Aug. 10, 1943 |
| 2,351,139 | McCloy | June 13, 1944 |
| 2,433,169 | Stephenson | Dec. 23, 1947 |
| 2,442,204 | Janos | May 25, 1948 |
| 2,464,923 | Davis | Mar. 22, 1949 |